Jan. 14, 1930.                    C. A. HOXIE                    1,743,779

NARROW LIGHT APERTURE

Filed Oct. 30, 1926

Inventor:
Charles A. Hoxie

Patented Jan. 14, 1930

1,743,779

UNITED STATES PATENT OFFICE

CHARLES A. HOXIE, OF ALPLAUS, NEW YORK, ASSIGNOR TO GENERAL ELECTRIC COMPANY, A CORPORATION OF NEW YORK

NARROW LIGHT APERTURE

Application filed October 30, 1926. Serial No. 145,349.

My invention relates to the recording and reproducing of sound by means of a light record on a moving photographic film. A present method of making a sound record on a moving film is to cause the film to pass a very narrow aperture through which light is admitted to expose the film in accordance with the sound waves to be recorded. Similarly, in reproducing the sound recorded on the film, light is allowed to pass through a narrow aperture into a photo-electric cell, the quantity of light being varied by the sound record on the film. In such apparatus it is essential that the aperture be extremely narrow; for example, best results have been obtained with apertures not over one one-thousandth of an inch wide. It is also essential that the clearance between the moving film and the aperture should be extremely small and the aperture must be of such a character that dust and dirt from the film will not collect in it and obstruct the passage of light therethrough. An object of my invention therefore is to provide an improved aperture having these essential features.

My invention will be better understood from the following description taken in connection with the accompanying drawing, and its scope will be pointed out in the appended claim.

Figure 1:
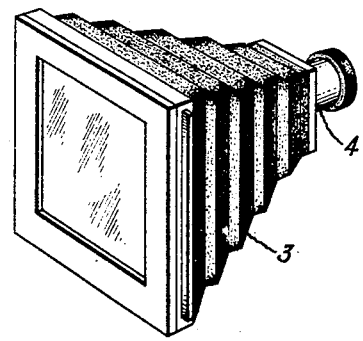
Figure 1:
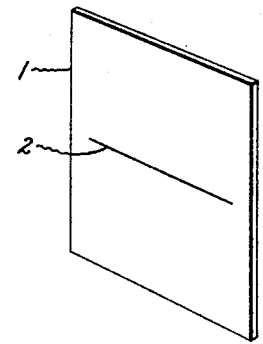
Figure 2:
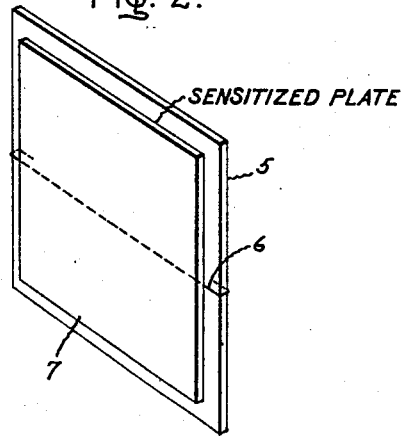

Referring to the drawing, Fig. 1 illustrates one form of apparatus for producing a narrow aperture in accordance with my invention and Fig. 2 illustrates a modified form.

In Fig. 1 of the drawing I have shown the screen 1 of light material preferably white having the straight black line 2 drawn thereon. At a suitable distance in front of the screen is the camera 3 whose lens 4 is directed toward the screen and is focused to produce a sharp image of the line 2 on a sensitive plate in the camera. The line 2 has sharp edges and has such a width that its photographed image shall have a width equal to the desired width of the aperture. The photographic plate may have a coating of opaque on its back or glass side to prevent halation. After the exposure is made, the plate is developed and fixed in the usual manner. If found desirable the negative may be intensified to make it more opaque except of course the image of the line which will be substantially transparent. As a protection to the emulsion on the negative I may cover it with a very thin coat of a suitable varnish and to prevent excessive heating of the negative when subjected to the intense light used in reproducing the record the glass side of the negative may be covered with thin aluminum foil with a small opening cut in it opposite the narrow light aperture. The light aperture thus formed can easily be made with the desired narrowness, there is no trough or groove to fill up with dust and dirt collected from the moving film and it presents a flat surface against which the film may move.

According to the modification illustrated by Fig. 2 I make a photographic image of a wire having a diameter equal to the width of aperture desired by exposing the plate with the wire close to or in contact therewith. For this purpose I have shown a clear glass plate 5 on one face of which is stretched the wire 6 having a diameter say of one one-thousandth of an inch and having its ends secured to the plate as for example by cement. A sensitive plate 7, preferably having its rear face painted with a suitable opaque to prevent halation is then placed next to the glass plate 5 with the emulsion side against the side of the glass plate carrying the wire. The plate is then suitably exposed for example to the light from a small incandescent lamp 8 placed a considerable distance away. The plate upon being developed may be intensified as before and may also be coated on the back with aluminum foil if desired. An opaque plate is thereby produced having a sharp transparent image of the wire, the width of the image being the same as the diameter of the wire, and having the advantages pointed out in connection with the first described form.

What I claim as new and desire to secure by Letters Patent of the United States, is:

In sound recording and reproducing apparatus a light aperture member for limiting the light therein to a narrow beam comprising a transparent plate having a photographic emulsion thereon, said emulsion being transparent in a portion forming a straight line having a width of the order of one thousandth of an inch and being substantially opaque in its remaining portions.

In witness whereof, I have hereunto set my hand this 28th day of October, 1926.

CHARLES A. HOXIE.